United States Patent
Lim et al.

(10) Patent No.: US 9,180,881 B2
(45) Date of Patent: Nov. 10, 2015

(54) BRAKING CONTROL SYSTEM AND METHOD FOR VEHICLE

(71) Applicants: Hyundai Motor Company, Seoul (KR); Kia Motors Corporation, Seoul (KR)

(72) Inventors: Hyung Jun Lim, Gyeonggi-do (KR); Yon Jun Jang, Gyeongsangnam-do (KR); Jong Chul Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/463,064

(22) Filed: Aug. 19, 2014

(65) Prior Publication Data
US 2015/0149037 A1    May 28, 2015

(30) Foreign Application Priority Data
Nov. 26, 2013    (KR) .......................... 10-2013-0144723

(51) Int. Cl.
*B60W 30/09*    (2012.01)
*B60W 10/184*    (2012.01)
*B60W 10/20*    (2006.01)
*B60W 40/105*    (2012.01)

(52) U.S. Cl.
CPC ............. *B60W 30/09* (2013.01); *B60W 10/184* (2013.01); *B60W 10/20* (2013.01); *B60W 40/105* (2013.01)

(58) Field of Classification Search
CPC . B60W 30/09; B60W 40/105; B60W 10/184; B60W 10/20
USPC ........................................................... 701/41
See application file for complete search history.

(56) References Cited

U.S. PATENT DOCUMENTS

| | | | |
|---|---|---|---|
| 7,202,776 B2 | 4/2007 | Breed | |
| 2005/0273215 A1 | 12/2005 | Kuge | |
| 2009/0088925 A1* | 4/2009 | Sugawara et al. ............... | 701/41 |

FOREIGN PATENT DOCUMENTS

| | | | |
|---|---|---|---|
| JP | 2006-199134 A | 8/2006 | |
| JP | 2009-078735 A | 4/2009 | |
| KR | 20060049522 A | 5/2006 | |
| KR | 20130089351 A | 8/2013 | |

* cited by examiner

*Primary Examiner* — Mary Cheung
*Assistant Examiner* — Brian P Sweeney
(74) *Attorney, Agent, or Firm* — Mintz Levin Cohn Ferris Glovsky and Popeo, P.C.; Peter F. Corless

(57) ABSTRACT

A braking control system and a method for a vehicle are provided. The braking control method includes sensing, by a controller, a rear-side collision risk and a lane change and determining a lane change intention based on a steering change of a vehicle. In addition, the controller is configured to determine a braking control for the vehicle and a magnitude of the braking control for the vehicle based on the rear-side collision risk and the lane change, and the lane change intention.

9 Claims, 6 Drawing Sheets

BRAKING CONTROL SYSTEM AND METHOD FOR VEHICLE

CROSS-REFERENCE TO RELATED APPLICATION

This application claims the benefit of priority to Korean Patent Application No. 10-2013-0144723, filed on Nov. 26, 2013 in the Korean Intellectual Property Office, the disclosure of which is incorporated herein in its entirety by reference.

BACKGROUND

1. Field of the Invention

The present invention relates to a braking control for a vehicle, and more particularly, a braking control system and a method for a vehicle that prevents accidents that may occur when a driver changes a lane or reducing damage caused by accident.

2. Description of the Related Art

A vehicle has an acceleration device and a braking device. The accelerating device and the braking device are operated based on a control of a driver and therefore, a state of the driver and surrounding environment affect the acceleration or brake of the vehicle. For example, when the driver does not have sufficient driving skills or the driver may not exhibit the ability by an indisposition, a risk of the accident is increases. To supplement these problems, in the related art, methods that perform automatic braking of the vehicle have been prepared. For example, the vehicle according to the related art may perform an automatic braking based on various accumulated sensor information. However, since the braking system for the vehicle according to the related art is focused on preventing the occurrence of collision with another vehicle, it is difficult to apply to the driving situation or the driver environment.

SUMMARY

The present invention provides a more stable braking control system and a method for a vehicle without additional parts cost and development cost by using a rear-side warning system, lane secession warning system, motor driven power steering (MDPS) and electronic stability control (ESC). In addition, the present invention further provides a braking control system and a method for a vehicle that may perform an appropriate control by analyzing the lane change intention of a driver.

In accordance with an aspect of the present invention, a braking control system for a vehicle may include a radar configured to collect sensing information to sense a rear-side collision risk; an imaging device configured to collect information to detect a lane change; a steering device configured to assist a steering change of a vehicle; a braking device configured to perform a braking control of the vehicle; and a controller configured to determine a lane change intention of a driver based on a degree of the steering change of the vehicle during the rear-side collision risk and the lane change, and adjust a magnitude of an auto-brake control for the vehicle by the braking device based on the lane change intention of the driver.

The braking control system for a vehicle may further include a vehicle speed sensor configured to sense a vehicle speed, wherein the controller may be configured to perform automatic brake control of the vehicle when the vehicle speed is a predetermined value or greater, and stop the braking control for the vehicle when the vehicle speed of the vehicle is less than the predetermined value. The controller may be configured to adjust a magnitude of a braking control time for the vehicle based on the lane change intention of the driver. The controller may be configured to reduce the braking control time for the vehicle to a predetermined magnitude or less based on the lane change intention of the driver. In addition, the controller may be configured to adjust a magnitude of an amount of side brake of the braking control for the vehicle based on the lane change intention of the driver.

In accordance with another aspect of the present invention, a braking control method for a vehicle may include sensing a rear-side collision risk and a lane change; determining a lane change intention of a driver based on a steering change of a vehicle; and determining a braking control for the vehicle and a magnitude of the braking control for the vehicle based on the rear-side collision risk and the lane change, and the lane change intention of the driver.

The method may further include sensing a vehicle speed; automatically braking the vehicle when the vehicle speed is a predetermined speed or greater; or stopping the braking control for the vehicle when the vehicle speed of the vehicle is less than the predetermined speed. In addition, the method may include adjusting at least one of a magnitude of braking control time for the vehicle and a magnitude of amount of side brake of the vehicle based on the lane change intention of the driver; reducing the braking control time for the vehicle to a predetermined magnitude or less when a lane change intention is detected; stopping the braking control for the vehicle when a rear collision risk of the vehicle is reduced to a predetermined magnitude or less due to an acceleration; stopping the braking control for the vehicle when the vehicle returns to a lane depending on an operation of the steering device; and stopping the braking control for the vehicle when the operation of the steering device having a predetermined magnitude or greater is generated.

BRIEF DESCRIPTION OF THE DRAWINGS

The objects, features and advantages of the present invention will be more apparent from the following detailed description in conjunction with the accompanying drawings, in which.

DETAILED DESCRIPTION

Figure 1:
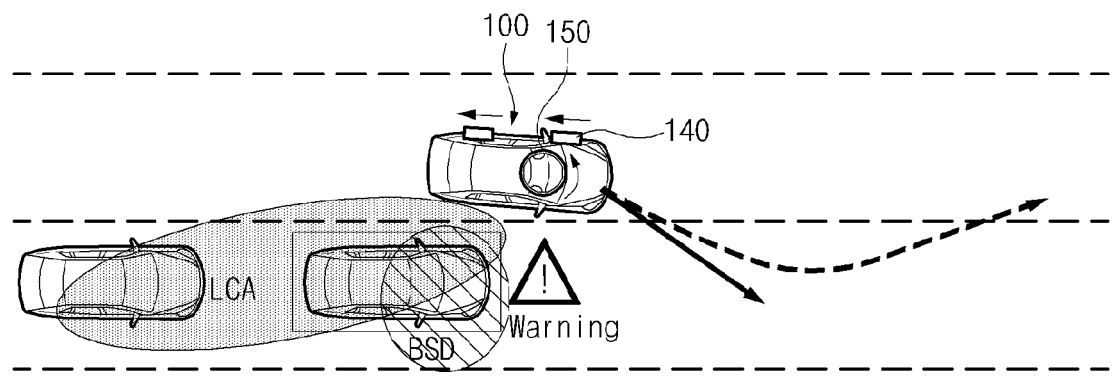
FIG. 1 is an exemplary diagram for illustrating a motion of a vehicle having a braking control system for a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

FIG. 1 is an exemplary diagram illustrating a motion of a vehicle having a braking control system for a vehicle according to an exemplary embodiment of the present invention. Referring to FIG. 1, a vehicle 100 equipped with a braking control system for a vehicle may be driven within a certain lane. In particular, the vehicle 100 (e.g., a controller disposed within the vehicle) may be configured to sense a rear-side collision and a lane change and determine a driving intention of a driver. The vehicle 100 may perform the braking control for the vehicle based on the determined driving intention of the driver and the sensed rear-side collision and lane change.

In particular, the vehicle 100 may perform the braking control for the vehicle with various types of magnitude based on the driving intention of the driver. For example, the vehicle 100 may operate (e.g., response) a different a braking device 140 and a steering device 150 based on the driving intention of the driver when the rear-side collision and the lane change are sensed. In other words, the controller of the vehicle 100 may be configured to differently adjust the braking time and magnitude of an electronic stability control (ESC) and a motor driven power steering (MDPS) depending on the driving situation.

According to the exemplary embodiment of the present invention, when the driving intention value of the driver is a previously defined value or greater when the rear-side collision and the lane change are sensed, for example, when the driver intends to change the lane, the vehicle 100 may be configured to perform the braking time and the magnitude by a first magnitude. In addition, when the driving intention value of the driver is less than the previously defined value, for example, when the driver does not intend to change the lane, the vehicle 100 may be configured to perform the braking time and the magnitude by a second magnitude different from the first magnitude. In particular, the driving intention value may be defined based on a progress displacement value of the vehicle 100 or a change of rotation magnitude value of the steering device, or may be determined based on intention of the lane change of the driver. The values of the braking time and the braking magnitude may be defined by a time magnitude value suppressing the variation in the vehicle steering and a pressure value applied to the braking.

Figure 2:
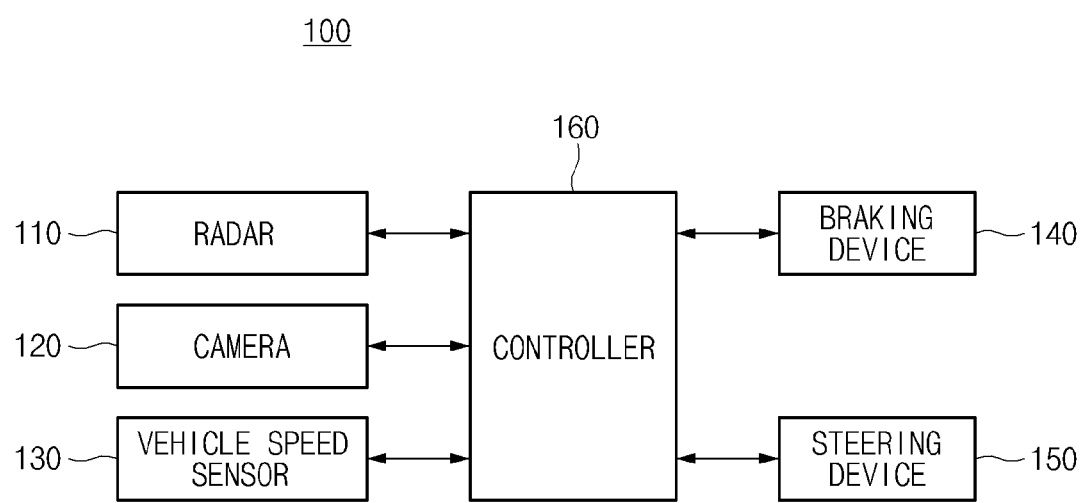
FIG. 2 is an exemplary diagram illustrating a configuration of a vehicle according to an exemplary embodiment of the present invention.

FIG. 2 is an exemplary diagram illustrating a configuration of a vehicle according to an exemplary embodiment of the present invention. Referring to FIG. 2, the vehicle 100 of the present invention may include a radar 110, an imaging device 120, a vehicle speed sensor 130, a braking device 140, a steering device 150 and a controller 160.

The radar 110 may be configured to collect the sensing information to sense the rear-side collision. When the braking control for the vehicle is activated, the radar 110 may be configured to transmit and receive a signal to collect the sensing information on a specific point (e.g., location) of the vehicle 100. When the sensing information is collected, the radar 110 may be configured to transfer the collected sensing information to the controller 160.

The imaging device 120 may be configured to obtain (e.g., capture) an image to sense the lane change. When the braking control for the vehicle is activated, the power of the imaging device 120 may be activated. For example, the imaging device 120 may be configured to obtain the image of a front or a front side of the vehicle, and may be configured to transfer the obtained image to the controller 160. In particular, the imaging device 120 may be disposed at a specific position of the vehicle 100 to obtain the image of the lane in which the vehicle is being driven.

The vehicle speed sensor 130 may be a sensor configured to sense the speed of the vehicle 100. The vehicle speed sensor 130 may be configured to collect the information on a speed meter that measures the vehicle speed. Additionally, the vehicle speed sensor 130 may be configured to collect the information regarding the speed of the vehicle, and may be configured to transfer the collected information to the controller 160.

The braking device 140 may be a device configured to perform the braking of the vehicle. In particular, the braking device 140 may perform the braking for each wheel of the vehicle 100. For example, the braking device 140 may perform the braking for each front wheel or the braking for each rear-wheel. In addition, the braking device 140 may perform the braking for any one of the front wheels and any one of the rear wheels, respectively. The braking device 140 may perform the braking for at least one wheel among a plurality of wheels. In particular, when the rear side collision and the lane change of the vehicle 100 are estimated, the braking device 140 may be configured to perform the braking for the front wheel and rear wheel disposed at a left side or the braking for the front wheel and rear wheel disposed at a right side, depending on a moving direction based on the front of the vehicle.

The steering device 150 may be a device that adjusts a direction (e.g., a steering direction) of the vehicle 100. For example, the steering device 150 may include a steering wheel and various mechanical devices connected to the steering wheel to adjust the rotation of the wheel. The steering device 150 may be configured to rotate the wheel in a particular direction based on the driving intention of the driver. The steering device 150 may be configured to transfer information regarding a steering angle to the controller 160 when the torque having a predetermined magnitude or greater is generated by external pressure. Further, the steering device 150 may be operated by the controller 160. For example, the steering device 150 may be configured to automatically rotate in a specific direction under the operation of the controller 160 when the lane change is performed when the rear side collision risk occurs (e.g., is sensed). According to the exemplary embodiment of the present invention, the steering device 150 may be rotated by a predetermined angle in an opposite direction to the direction in which the lane change is performed.

The controller 160 may be configured to perform an overall operation control of the vehicle 100. In particular, the controller 160 may be configured to determine an activation of an auto-brake control mode of the vehicle 100, and then, sense the rear side collision risk and the lane change to determine the driver intention. Additionally, the controller 160 may be configured to perform at least one of the braking control and steering control for the vehicle at a predetermined level based on the sensing result of the vehicle 100. For example, the controller 160 operate a separate control of the vehicle even though the lane change is sensed when the rear side collision risk is not sensed. The controller 160 may be configured to determine a steering change intention when the lane change is sensed and when the rear side collision risk is sensed.

Further, the controller 160 may be configured to adjust the magnitude of the control for the vehicle based on the magnitude of the intention value of the driver. For example, the controller 160 may be configured to adjust control time and control magnitude for the vehicle by more than a predetermined magnitude when the driver intention value is less than a preset value. Accordingly, the vehicle 100 may be configured to cancel the lane change. In particular, the controller 160 may be configured to operate the braking device 140 and the steering device 150 to move the vehicle 100 in the direction in which the lane change is not performed.

Furthermore, the controller 160 may be configured to adjust the control time and control magnitude for the vehicle to be less than a predetermined magnitude when the rear side collision risk and the lane change are sensed and the driver intention value is a predetermined value or greater. Accordingly, the vehicle 100 may maintain the steering angle to change the lane based on the driver intention. Meanwhile, the above-mentioned controller 160 may be configured to sense the speed of the vehicle 100 and apply the braking control for the vehicle when the speed of the vehicle is a predetermined speed or greater. To sense the rear side collision risk, the controller 160 may be configured to determine the risk degree for the rear vehicle (e.g., the vehicle at the rear of the vehicle being driver, a succeeding vehicle). In this process, the controller 160 may be configured to determine the lane change intention based on time to lane crossing (TLC) of the vehicle being driven. The TLC of the vehicle may be calculated by the following Equation 1.

$$TLC = \frac{\frac{W_{Lane}}{2} - y}{v_y + a_y} \quad \text{Equation 1}$$

wherein, $W_{Lane}$ is a width of drive lane, y is a yaw rate of the front of the vehicle within the lane, $v_y$ is a lateral speed of the vehicle, and $a_y$ is a lateral acceleration of the vehicle. The controller 160 may be configured to determine whether another vehicle is approaching from the rear when the lane departure is determined. The controller 160 may be configured to determine the risk degree of the warned vehicle (e.g., the approaching vehicle/rear vehicle) when blind spot detection zone (BSD)/lane change assist zone (LCA) system generates a warning. The controller 160 may be configured to determine a vehicle collision time (TTC) for each speed section based on the previously defined certain value, for example, the following Equation 2 for the time to lane crossing (TLC) related to the determination of the risk degree of the rear vehicle.

$$TTC = \begin{cases} 1.4 \text{ sec} & (\Delta V \geq 8.3 \text{ m/s}) \\ \frac{1.4 \times \Delta V}{8.3} \text{ sec} & (\Delta V < 8.3 \text{ m/s}) \end{cases} \quad \text{Equation 2}$$

When the rear side vehicle collision risk occurs, the controller 160 may be configured to determine the lane change intention of the driver. In the determination of the lane change intention of the driver, a threshold value of the steering angle based on an average lateral displacement, a standard deviation of the lateral displacement, a standard deviation of the steering angel, and the excess rate of designated section of the steering angle may be considered. ΔV means a relative velocity between a vehicle and the rear vehicle.

First, to calculate the average lateral displacement (MLP), the controller 160 may use the following Equation 3.

$$MLP = \frac{\sum_{i=1}^{n} y_i}{n} \quad \text{Equation 3}$$

wherein, $y_i$ is a lateral distance between the center of the lane and the center of the front of the vehicle and n is the total number of measurement data. To calculate the standard deviation of the lateral displacement (SDLP), the controller 160 may use the following Equation 4.

$$SDLP = \sqrt{\frac{\sum_{i=1}^{n}(y_i - y_{avg})}{n}} \quad \text{Equation 4}$$

wherein, $y_i$ is a lateral distance between the center of the lane and the center of the front of the vehicle, $y_{avg}$ is an average value of the lateral distance between the center of the lane and the center of the front of the vehicle, and n is the total number of measurement data.

Further, to calculate the standard deviation of the steering angle (SDST), the controller 160 may use the following Equation 5.

$$SDST = \sqrt{\frac{\sum_{i=1}^{n}(\phi_i - \phi_{avg})}{n}} \quad \text{Equation 5}$$

wherein, $\phi_i$ is a steering angle of the steering wheel, $\phi_{avg}$ is an average value of the steering angle of the steering wheel, and n is the total number of measurement data.

To calculate the excess rate of designated section of the steering angle (SRR), the controller 160 may use the following Equation 6.

$$SRR = \frac{n_{gap}}{t_{driven}} \quad \text{Equation 6}$$

wherein, $n_{gap}$ is the number of times by which a difference between the minimum vale and maximum value of adjacent steering angles exceeds a designated range (e.g., 2deg) after removing a noise, and $t_{driven}$ is a driving time that exceeds the designated range.

When the threshold value of the steering angle is calculated, the controller 160 may be configured to determine the lane change intention value by comparing a predetermined value calculated based on the steering speed, the steering angle displacement, the steering angle and the vehicle speed value with the threshold value of the steering angle. When the lane change intention value is determined, the controller 160 may be configured to perform the adjustments as shown in table 1 based on the lane change intention and the rear collision risk.

TABLE 1

| | Rear collision risk (O) | Rear collision risk (X) | Remark |
|---|---|---|---|
| Lane change intention (O) | Collision avoidance assist through ESC side brake + MDPS control | MDPS lane change assist | |
| Lane change intention (X) | Collision avoidance assist through ESC side brake + MDPS control | Collision avoidance assist through ESC side brake + MDPS control | Variable conversion of the control time and the amount of side brake according to the collision risk |

Figure 3:
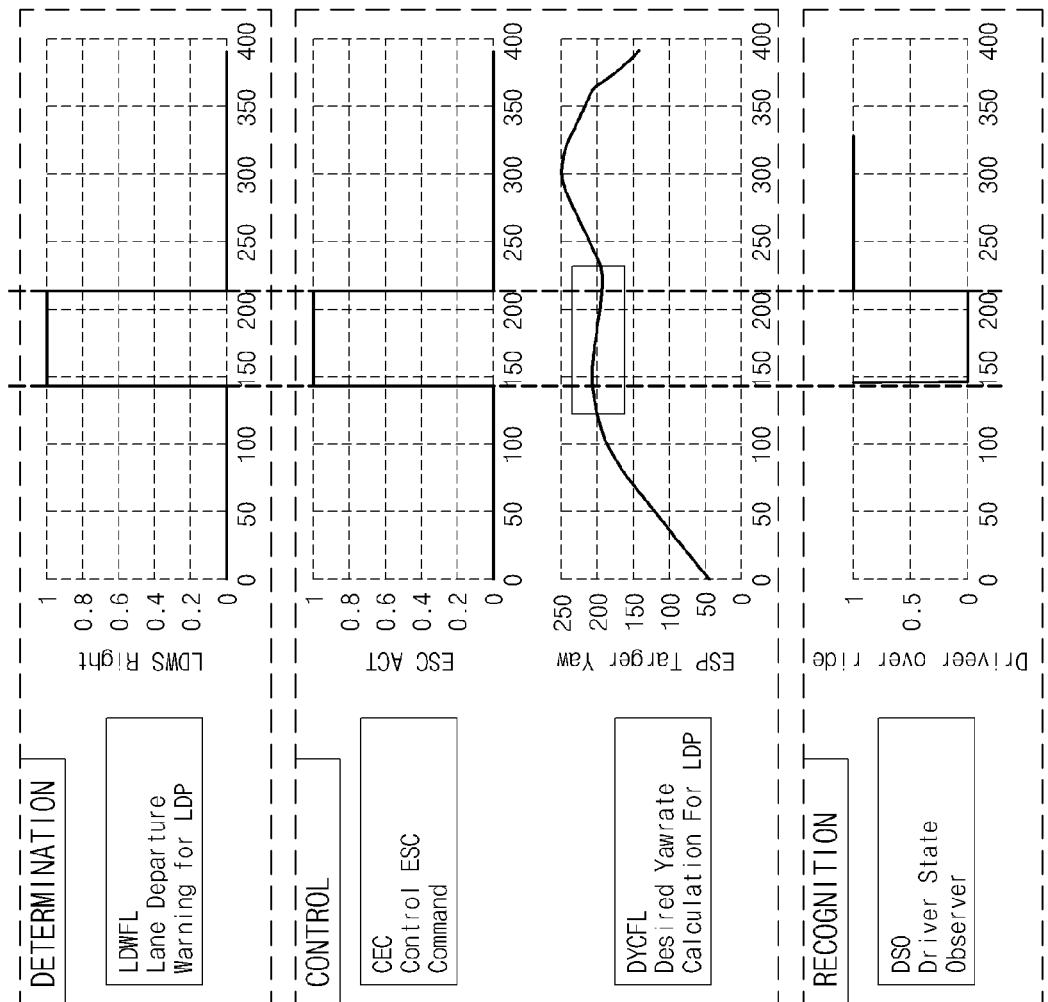
FIG. 3 is an exemplary diagram illustrating a braking control situation for a vehicle according to an exemplary embodiment of the present invention.
Figure 3:
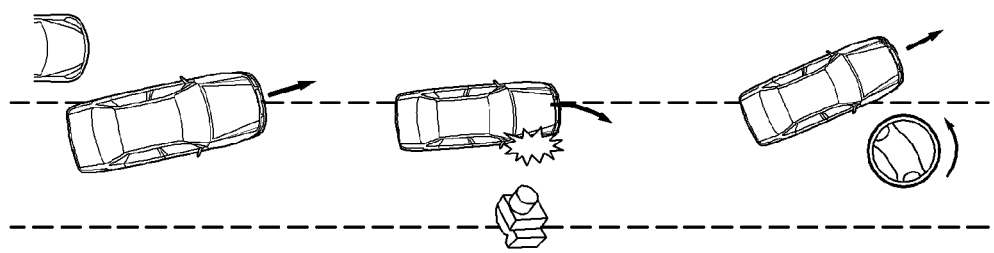

FIG. 3 is an exemplary diagram illustrating a braking control situation for a vehicle according to an exemplary embodiment of the present invention. Referring to FIG. 3, when the rear side collision situation is estimated based on the image obtained using the imaging device 120 when the speed of the first vehicle 100 (e.g., the vehicle being driven) is a predetermined value or greater, the controller 160 may be configured to perform a determination process by the warning for the lane change. During a determination process, the controller 160 may be configured to perform the determination by the lane departure warning system (LDWS) as shown in FIG. 3. The controller 160 may be configured to perform a control ESC command (CEC) process that performs the ESC and a desired yaw rate calculation for LDP (DYCFL) process that performs an electronic stability program (ESP), during a control process as shown in FIG. 3. In addition, the controller 160 may be configured to determine the lane change intention of the driver based on the information obtained from the steering device 150 during the control process. Then, the driver of the vehicle 100 may perform a driver state observer (DSO) of a recognition process as shown in FIG. 3.

The above-mentioned vehicle 100 may be configured to adjust the control time of the system having an average operation time of about 1.5 to 1.9 s related to the control for the vehicle depending on the determined driver intention and the risk degree, thereby minimizing the discomfort during the control process. For example, the vehicle 100 according to the exemplary embodiment of the present invention may end the control approximately in about 0.5s when the driver intends to change the lane and the collision risk is minimal to minimize the control that is unnecessary to the driver, thereby minimizing the discomfort due to the unnecessary control.

Figure 4:
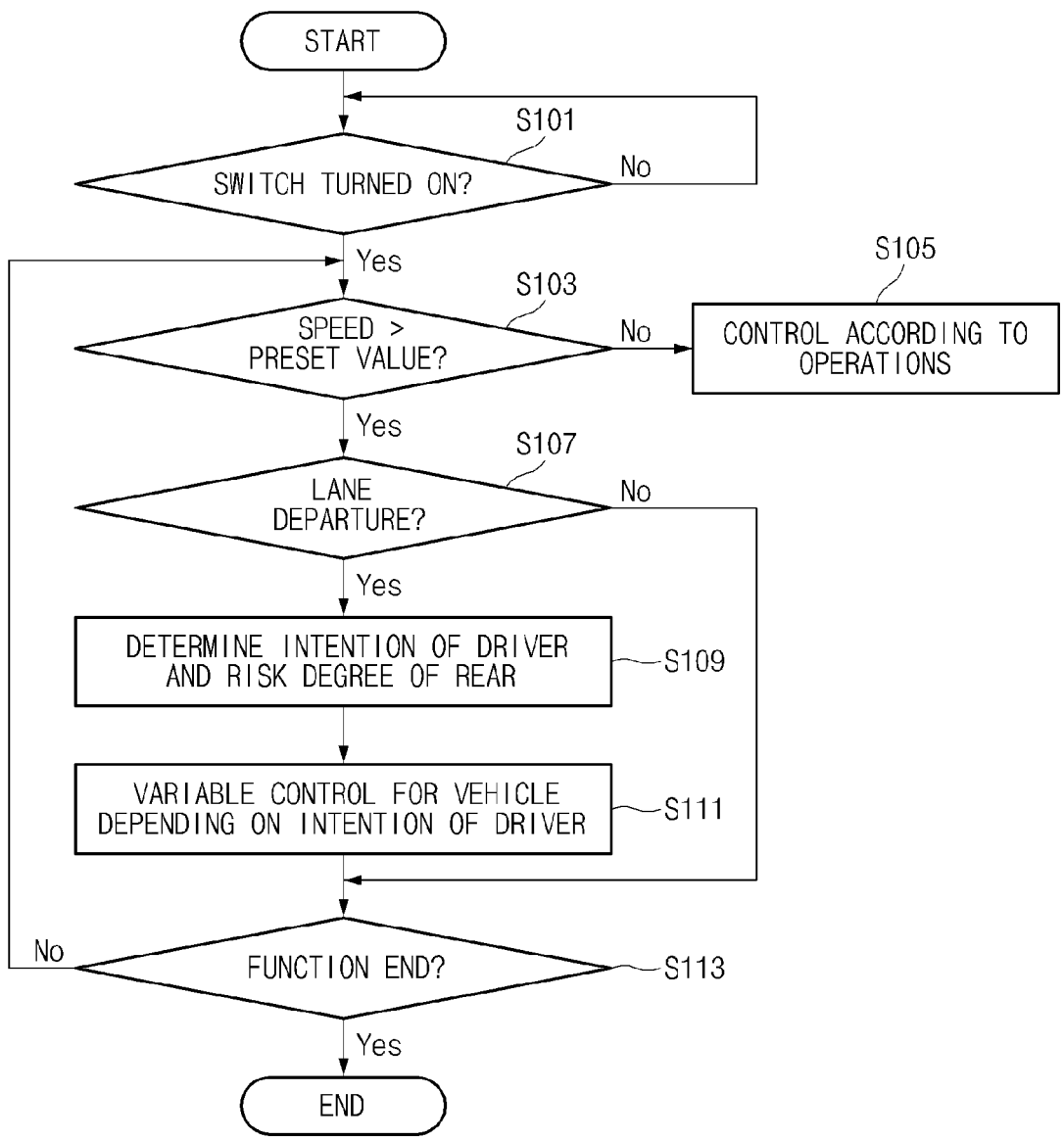
FIG. 4 is an exemplary diagram illustrating a braking control method for a vehicle according to an exemplary embodiment of the present invention.

FIG. 4 is an exemplary diagram illustrating a braking control method for a vehicle according to an exemplary embodiment of the present invention. Referring to FIG. 4, in the braking control method for the vehicle, first, at step S101, the controller 160 may be configured to determine whether a switch is turned on. When the switch is turned off, the controller 160 may be configured to wait for the braking control for the vehicle. When the switch is turned on at step S101, at step S103, the controller 160 may be configured to determine whether the vehicle speed is a predetermined speed or greater. When the speed of the vehicle is less the predetermined speed, the controller 160 may proceed to step S105 to operate the vehicle.

Meanwhile, when the speed of the vehicle is the preset value (e.g., predetermined speed) or greater at step S103, at step S107, the controller 160 may be configured to determine whether the vehicle 100 is departing from the lane in which the vehicle is being driven. When the vehicle 100 departs from the lane, at step S109, the controller 160 may be configured to determine the lane change intention and the rear risk degree. Then, at step S111, the controller 160 may be configured to perform a variable control for the vehicle depending on the lane change intention. For example, the controller 160 may be configured to differently adjust the braking time for the braking control for the vehicle depending on the lane change intention. In addition, the controller 160 may be configured to differently adjust the braking magnitude for the braking control for the vehicle depending on the lane change intention. Then, at step S113, the controller 160 may be configured to determine whether an event for function end occurs, and when a separate event does not occur, the controller 160 may return to step S103 for the braking control for the vehicle.

Figure 5:
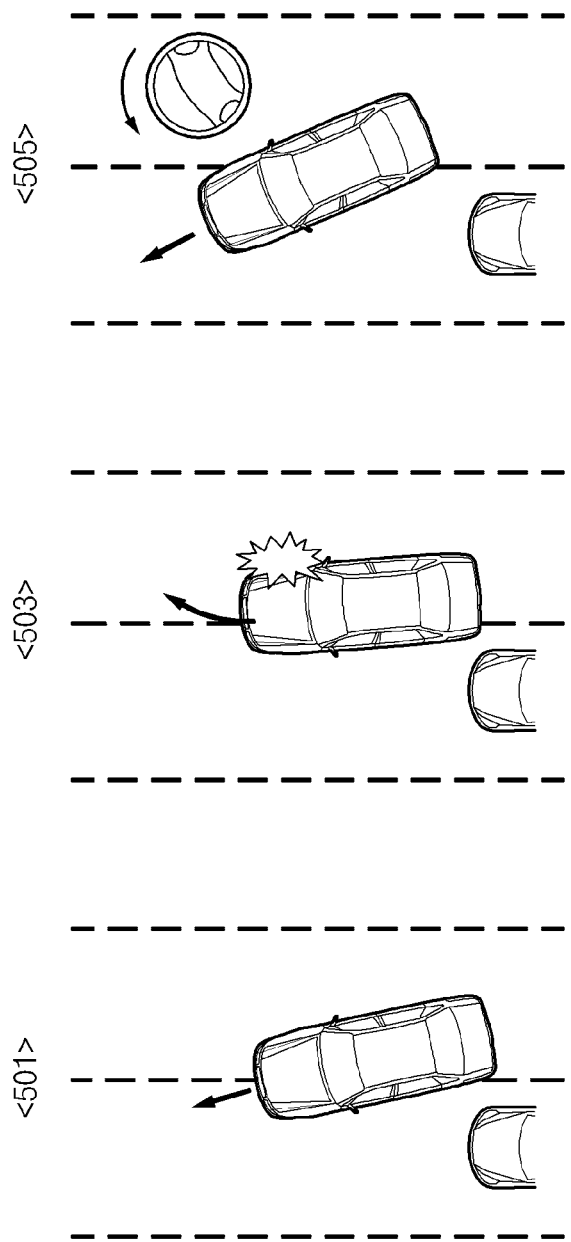
FIG. 5 is an exemplary diagram illustrating various examples related to a braking control for a vehicle according to an exemplary embodiment of the present invention.

FIG. 5 is an exemplary diagram illustrating various examples related to a braking control for a vehicle according to an exemplary embodiment of the present invention. Referring to FIG. 5, in 501, when the collision does not actually occur as the risk degree of rear collision is decreased due to the acceleration of the driver, the controller 160 may be configured to stop the braking control for the vehicle to minimize the unnecessary control of the vehicle. In addition, in 503, when the driver actively operates the vehicle to return to the lane such that braking control is no longer not necessary, the controller 160 may be configured to stop the braking control for the vehicle. As shown in 505, when the driver intends to control the vehicle 100 despite an increased risk, the controller 160 may be configured to minimize interference with the driver intention. In particular, the operation of the controller 160 precedes, however, when the driver has the intention to operate the vehicle, the braking control may be stopped.

Figure 6:
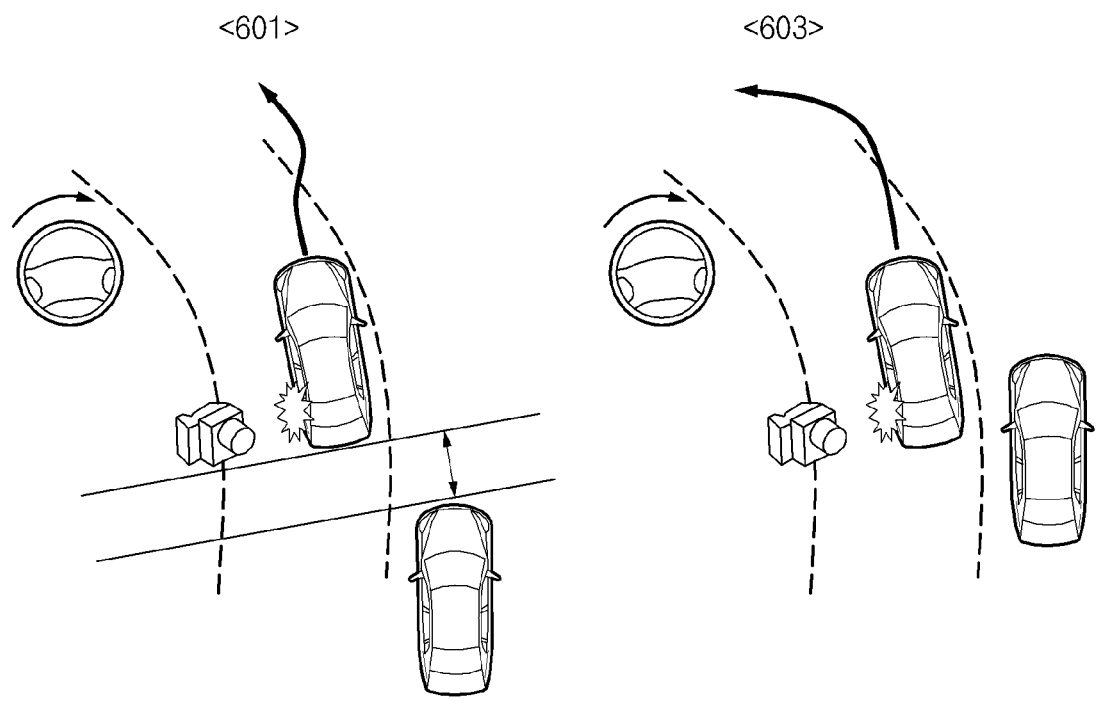
FIG. 6 is an exemplary diagram illustrating an example related to a braking control time for a vehicle according to an exemplary embodiment of the present invention.

FIG. 6 is an exemplary diagram illustrating an example related to a braking control time for a vehicle according to an exemplary embodiment of the present invention. Referring to FIG. 6, as shown in 601, when a lane change intention is detected, the controller 160 of the vehicle 100 may be configured to determine the risk degree of collision of the rear or rear side and may operate the steering device 150 for the lane return of the vehicle 100 (e.g., an original lane or to steer the vehicle back into the lane it was previously traveling in, that is, avoid lane change) when the risk degree of the collision is the predetermined value or greater. In particular, the controller 160 may be configured to determine the driver intention and operate the vehicle 100 by reflecting the determined driver intention. Additionally, the controller 160 may be configured to adjust the control time for the vehicle 100. During this process, when a probability of colliding with a side vehicle is the threshold value or greater, the controller 160 may be configured to cancel the control (e.g., operation) for the vehicle 100.

Further, when the risk degree of the collision is a predetermined value or less, the controller 160 may be configured to cancel the control for the vehicle 100. Accordingly, as shown in FIG. 6, the vehicle 100 may be partially returned to the inside of the lane. Then, as the risk degree of the collision is reduced, the control for the vehicle may be canceled, and the lane change may be performed. Meanwhile, when the risk degree of the collision with the rear side vehicle is a predetermined value or greater, the controller 160 may be configured to operate the vehicle 100 to avoid the collision with the rear side vehicle regardless of the driver intention. During this process, the controller 160 may be configured to temporarily adjust the control time until the risk degree of the collision is less than the predetermined value.

As described above, the braking control for the vehicle according to the exemplary embodiment of the present invention may determine the risk degree of the collision for a target vehicle sensed by the rear radar using a rear radar, an ultrasonic sensor, a rear imaging device, and the like to control the vehicle when the control is required. For example, during the lane change, the braking control for the vehicle may select the target vehicle which may be dangerous to calculate the probability of the actual collision with the target vehicle. Further, when a possibility of collision is present, the collision may be avoided using the ESC side brake and the DMPS, and damage may be minimized even when the vehicle collides with the target vehicle. In particular, the control for the vehicle may be performed in consideration of the lane change intention or lane maintenance intention of the driver, to reduce the discomfort of the system felt by the driver and reduce the unnecessary warnings and controls.

As set forth above, according to the exemplary embodiment of the present invention, the braking control may be appropriately provided according to the situation when the driver senses an obstacle and the vehicle approaching from the rear and attempts to change the lane.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the accompanying claims.

What is claimed is:

1. A braking control system for a vehicle, the system comprising:
   a radar configured to collect sensing information to sense a rear-side collision risk;
   an imaging device configured to collect information to sense a lane change; and
   a controller configured to:
      determine a lane change intention based on a degree of a steering change of the vehicle during the rear-side collision risk and the lane change;
      operate a steering device to adjust the steering change of the vehicle; and
      adjust a magnitude of an auto-brake control and a magnitude of a braking control time for the vehicle by a braking device according to the lane change intention.

2. The braking control system for a vehicle of claim 1, further comprising:
   a vehicle speed sensor configured to sense a vehicle speed,
   wherein the controller is configured to automatically brake the vehicle when the speed of the vehicle is a predetermined speed or greater, and stop the automatic braking when the speed of the vehicle is less than the predetermined speed.

3. The braking control system for a vehicle of claim 1, wherein the controller is configured to reduce the braking control time for the vehicle to a predetermined magnitude or less based on the lane change intention.

4. The braking control system for a vehicle of claim 1, wherein the controller is configured to adjust a magnitude of an amount of side brake during the automatic braking based on the lane change intention.

5. A braking control method of a braking control system for a vehicle, the method comprising:
   sensing, by a controller, a rear-side collision risk collected by a radar and a lane change sensed by an imaging device;
   determining, by the controller, a lane change intention based on a steering change of the vehicle collected by a steering device;
   determining, by the controller, a braking control for the vehicle;
   operating, by the controller, the steering device to adjust the steering change of the vehicle; and
   adjusting, by the controller, a magnitude of the braking control and magnitude of a braking control time for the vehicle based on the rear-side collision risk and the lane change, and the lane change intention.

6. The method of claim 5, further comprising:
   sensing, by the controller, a vehicle speed,
   automatically braking, by the controller, the vehicle when the speed of the vehicle is a predetermined speed or greater; and
   stopping, by the controller, the automatic braking of the vehicle when the speed of the vehicle is less than the predetermined speed.

7. The method of claim 5, further comprising:
   adjusting, by the controller, at least one of the magnitude of braking control time for the vehicle and a magnitude of amount of side brake during the automatic braking based on the lane change intention.

8. The method of claim 7, further comprising:
   reducing, by the controller, the braking control time for the vehicle to a predetermined magnitude or less in response to determining a lane change intention.

9. The method of claim 5, further comprising:
stopping, by the controller, the automatic braking of the vehicle when a rear collision risk of the vehicle is reduced to a predetermined magnitude or less due to an acceleration;
stopping, by the controller, the automatic braking of the vehicle when the vehicle returns to an original lane based on an operation of the steering device; and
stopping, by the controller, the automatic braking of the vehicle when the operation of a steering device having a predetermined magnitude or greater is generated.

\* \* \* \* \*